(12) United States Patent
Mager et al.

(10) Patent No.: US 7,590,723 B2
(45) Date of Patent: Sep. 15, 2009

(54) SYSTEM AND METHOD FOR TARGETING ADVERTISEMENTS TO TENANTS IN A BUILDING

(75) Inventors: Scott Mager, New York, NY (US); Jeffrey C. Friedman, New York, NY (US)

(73) Assignee: Short Path Inc., New York, NY (US)

( * ) Notice: Subject to any disclaimer, the term of this patent is extended or adjusted under 35 U.S.C. 154(b) by 352 days.

(21) Appl. No.: 09/960,994

(22) Filed: Sep. 25, 2001

(65) Prior Publication Data
US 2002/0038341 A1 Mar. 28, 2002

Related U.S. Application Data

(60) Provisional application No. 60/234,758, filed on Sep. 25, 2000.

(51) Int. Cl.
G06F 15/173 (2006.01)
G06Q 30/00 (2006.01)

(52) U.S. Cl. ............... 709/224; 709/225; 705/14

(58) Field of Classification Search ......... 709/203, 709/222, 223, 224, 229, 225, 226, 212, 217, 709/218; 705/14
See application file for complete search history.

(56) References Cited

U.S. PATENT DOCUMENTS

| | | | | |
|---|---|---|---|---|
| 5,915,243 A * | 6/1999 | Smolen | ....................... | 705/14 |
| 5,933,811 A * | 8/1999 | Angles et al. | ................. | 705/14 |
| 6,047,327 A * | 4/2000 | Tso et al. | ..................... | 709/232 |
| 6,157,943 A * | 12/2000 | Meyer | ....................... | 709/203 |
| 6,182,050 B1 * | 1/2001 | Ballard | ....................... | 705/14 |
| 6,594,682 B2 * | 7/2003 | Peterson et al. | ............. | 718/102 |
| 6,622,826 B2 * | 9/2003 | Amo et al. | ................... | 187/391 |
| 6,669,832 B1 * | 12/2003 | Saito et al. | ..................... | 705/26 |
| 6,678,663 B1 * | 1/2004 | Mayo | ......................... | 705/14 |
| 7,028,268 B1 * | 4/2006 | Conley, Jr. | ................... | 715/841 |
| 7,174,301 B2 * | 2/2007 | Florance et al. | ................ | 705/1 |
| 2002/0112925 A1 * | 8/2002 | DiFranza et al. | ............ | 187/391 |
| 2003/0209392 A1 * | 11/2003 | DiFranza et al. | ............ | 187/391 |
| 2004/0223047 A1 * | 11/2004 | Horie et al. | ................. | 347/243 |
| 2006/0021827 A1 * | 2/2006 | DiFranza et al. | ............ | 187/393 |
| 2006/0144647 A1 * | 7/2006 | Newville et al. | ............ | 187/396 |
| 2007/0102244 A1 * | 5/2007 | DiFranza et al. | ............ | 187/391 |

OTHER PUBLICATIONS

Motoko Rich, "Office Buildings Hope Tenants Are Shoppers On New Portals", Wall Street journal, p. B1, Mar. 30, 2000.*
eBay the Smart Way by Joseph T. Sinclair, American Management Association. Amacom books, 2000 Ebook ISBN : 9780585104140.*
Motoko Rich, "office building Hope Tenants Are Shoppers On New Portal" Wall Street Journal, p. B1 Mar. 30, 2000.*

* cited by examiner

Primary Examiner—Ario Etienne
Assistant Examiner—Sargon N Nano
(74) Attorney, Agent, or Firm—Stroock & Stroock & Lavan LLP (57) ABSTRACT

A system and method for targeting advertisements to tenants in a building by providing a portal for a building accessible via the Internet with the portal based upon the specific needs of targeted advertising in the building. Advertisements are received from a user of the portal and the advertisements are distributed to a target audience in the building that is determined based upon historical transaction data for the building. A user is provided with the historical transaction data of previous transactions by tenants in the building. The portal is designed to suit the specific needs of a building.

12 Claims, 7 Drawing Sheets

SYSTEM AND METHOD FOR TARGETING ADVERTISEMENTS TO TENANTS IN A BUILDING

CROSS-REFERENCE TO RELATED APPLICATION

This application relates to and claims priority of Provisional Application Ser. No. 60/234,758 filed on Sep. 25, 2000, and entitled "System and Method for Targeting Advertisements to Tenants in a Building."

BACKGROUND OF THE INVENTION

Field of the Invention

The present invention relates to system and method for targeting advertisements to tenants in a building. More particularly, the invention is directed to distributing advertisements using an Internet-based portal to provide targeted and focused advertising with respect to products and services directed to tenants in a building.

It is essential for the success of any business or organization to be able to target a communication to a specific segment of the public. It can be said that communicating effectively with selected individuals or groups of individuals is one of the principal keys to the success of any business or organization.

To target a communication, such as an advertisement, it is necessary to qualify selected individuals or groups of individuals in the general public having a need for a given product or service. Inasmuch as the public possesses diverse characteristics, a variety of qualification factors are employed. For example, age, education, income and other demographic qualification factors are commonly used to help to target communications.

Numerous data sources have been developed to help a business target its advertising efforts. For example, some companies establish databases containing information relating to individuals who have or may have utilized certain products or services in the past. Similarly, some companies conduct market research to develop customer intelligence information from interviews and telephone solicitations. Related data is also obtained from other sources such as zip code-based address market data services, government motor vehicle listings, as well as from analyzing customer transaction data, such as the purchasing habits of a credit card holder.

Recent advancements in the Internet have brought, via the World Wide Web (the "Web"), a potential to automate many of the manual processes executed daily by people in large commercial office buildings, particularly with regard to e-commerce and to the management of the building infrastructure and environment. The development of e-commerce in a building network presents many opportunities for businesses and organizations to identify and reach a highly focused, targeted micro-audience. It would be desirable to provide a way to successfully integrate such processes for targeted advertising with the Web, which would fundamentally change the way businesses allocate their advertising budgets.

It would be highly desirable for a business or organization to be able to target their advertising to all of the tenants of a particular building. For example, a dry cleaning store near a large commercial building would certainly like to advertise their services to all of the tenants in the building, who probably have a significant need for dry cleaning services since they mainly comprise office workers. In the prior art, such advertising is accomplished by physically posting hardcopy advertisements within or in the physical vicinity of the building housing the target audience. Further, advertising in the prior art is also distributed by other routes typical of the industry, such as by mail delivery, fax, telephone solicitations and door-to-door visits. However, this is very resource intensive. In addition, although a vendor can also advertise on the Internet, the prior art offers no way to target advertising to all tenants in a particular building. Therefore, there is a need for a way to target advertising to all tenants in a particular building.

It would also be highly desirable for a business or organization to be able to target their advertising to selected tenants in a particular building. For example, a vendor of laser printer ink cartridges would certainly like to advertise their services to tenants in a building who own a laser printer. Therefore, there is a need for a way to target advertising to selected tenants in a particular building.

A portal is a Web "super-site" providing access to a variety of integrated services including Web searching, news, white and yellow pages directories, e-mail, discussion groups, online shopping and hyperlinks to other Web sites. A portal is the Web equivalent to the original integrated online services such as CompuServe and AOL. Unfortunately, portals in the prior art are not designed to suit the specific needs of targeting advertisements to tenants of a particular building.

Accordingly, it would be desirable to provide a system and method for targeting advertisements to tenants in a building, which streamline the processes of distributing targeted advertisements to the tenants in the building. In this, it would be highly desirable to provide successful integration of such processes with the Web, for example, by means of a portal for a building, which would fundamentally change the way advertisements are distributed to tenants in a building, resulting in a highly efficient process and substantial economic savings.

The difficulties, limitations and desires suggested in the preceding are not intended to be exhaustive, but rather are among many which demonstrate that prior art systems and methods for targeting advertisements to tenants in a building will admit to worthwhile improvement.

OBJECTS OF THE INVENTION

It is, therefore, a general object of the invention to provide a system and method for targeting advertisements to tenants in a building, which streamline the process of targeted advertising in a building thereby obviating or minimizing difficulties of the type previously described.

It is another general object of the invention to provide a system and method for targeting advertisements to tenants in a building, which integrate the processes with the Web.

It is a specific object of the invention to provide a system and method for targeting advertisements to tenants in a building using a Web-based portal for a building, resulting in a highly efficient process and substantial economic savings.

It is another specific object of the invention to provide a system and method for targeting advertisements to tenants in a building network system.

It is yet another specific object of the invention to provide a system and method for targeting advertisements to tenants in a building which automatically differentiate tenants in a building.

It is yet another specific object of the invention to provide a building network system for targeting advertisements to particular tenants in a particular building through a portal designed to suit the specific needs of the building.

It is yet another specific object of the invention to provide a process of using a building network system to create a portal designed to suit the specific needs of targeted advertisements to tenants in a building.

It is yet another specific object of the invention to provide a system and method for targeting advertisements to tenants in a building by using a Web-based portal to distribute the advertisements to particular tenants in a particular building.

It is another specific object of the invention to provide a system and method for targeting advertisements to tenants in a building which track and monitor historical transaction data and provide such data through a Web-based portal.

It is yet another specific object of the invention to provide a system and method for targeting advertisements to tenants in a building which utilizes a computer connected with the Internet.

It is another specific object of the invention to provide a system and method for targeting advertisements to tenants in a building with a computer system accessible via the Internet.

SUMMARY OF THE INVENTION

To achieve at least some of the foregoing objects, the invention provides a method for targeting advertisements to tenants in a building by providing a portal for a building accessible via the Internet. At least one user is associated with the portal for the building. A request is received from the user to place an advertisement targeted at tenants in the building and the advertisement is placed at the portal in accordance with the targeted tenants in the building.

A home page is provided for each user of the portal with each user being uniquely identified and having a specific user role with respect to the portal for the building. A request is received from the user for historical transaction data and the user is provided with the requested historical transaction data. The targeted tenants in the building are determined based upon the historical transaction data.

The historical transaction data is one or more of data processed by building and data processed by tenant. The historical transaction data includes data previously stored at the time of each transaction by a user of the portal.

In a preferred embodiment of the invention, the building is a building network.

A user of the portal is provided with access to an anonymous user home page and whether the user is one of a building user and a vendor user is determined. Data input by the user with respect to a user profile is received and the data are processed to create one of a building user home page and a vendor user home page.

A system for targeting advertisements to tenants in a building is provided having at least one server accessible via a communications network with a portal for the building accessible by one or more user via the communications network. The server further includes a receiving module operable to receive a request from a user to place an advertisement targeted at tenants in the building; a transmitting module operable to place the advertisement at the portal in accordance with the targeted tenants in the building; and a database operable to store a user profile for each user of the portal and historical transaction data for determining the targeted tenants in the building.

The portal includes a home page for each user of the portal and each user is uniquely identified and has a specific user role with respect to the portal for the building.

In a preferred embodiment of the invention, the building is a building network and the communications network is the Internet.

DRAWINGS

Other objects and advantages of the present invention will become apparent from the following detailed description of preferred embodiments thereof taken in conjunction with the accompanying drawings, wherein.

DETAILED DESCRIPTION

Figure 1:
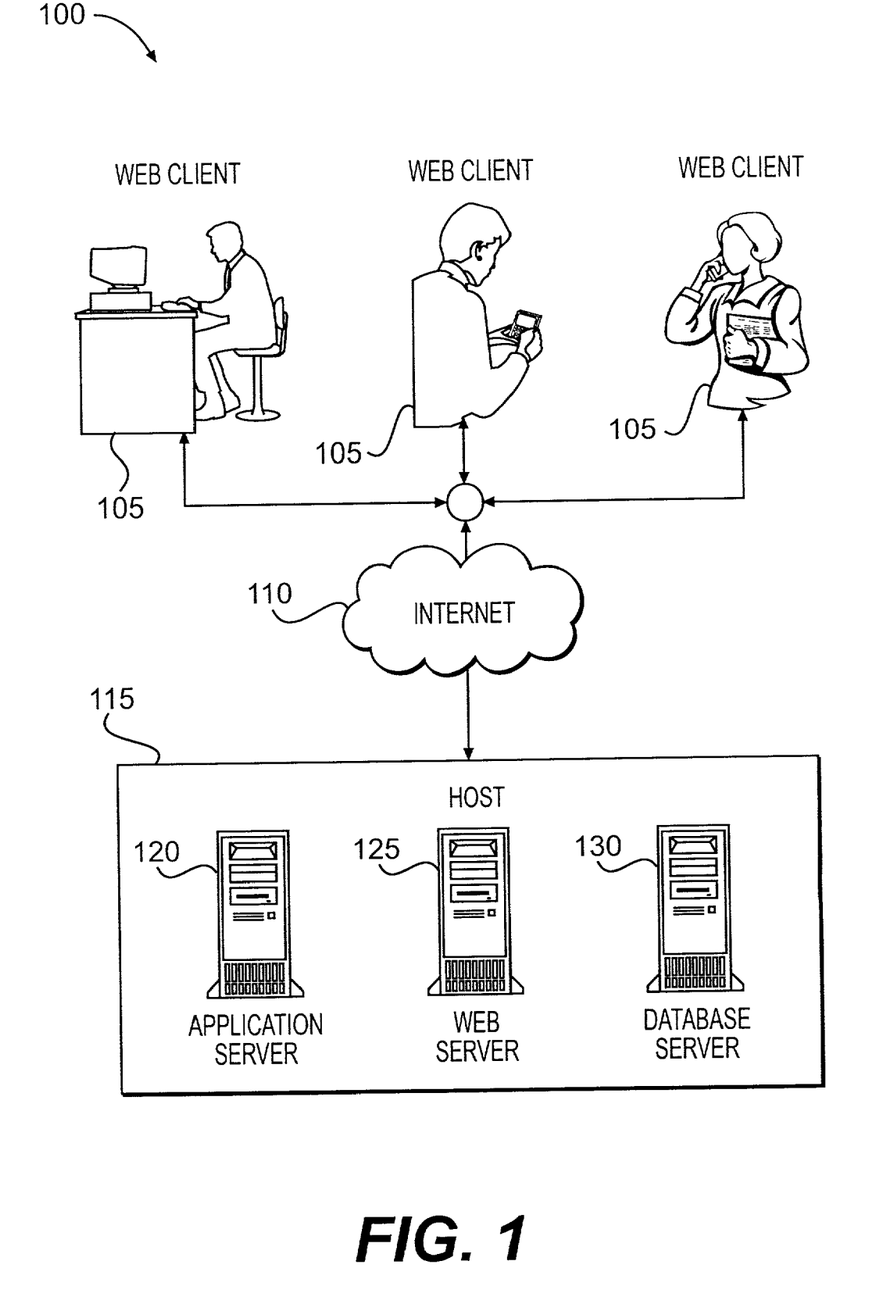
FIG. 1 shows schematically a building network system for targeting advertisements to tenants in a building according to a preferred embodiment of the present invention.

Referring to FIG. 1, a building network system 100, according to a preferred embodiment of the present invention, includes one or more Web clients 105, the Internet 110, and a host 115. Web clients 105 include any conventional system for accessing the Internet, such as a personal computer with a Web browser, personal digital assistant (PDA) including a Web browser, and cellular telephone further including a wireless application protocol (WAP) based browser.

Host 115 further includes elements commonly employed by most internet service providers (ISPs), such as an application server 120, Web server 125, and database server 130. Host 115 further provides a Web-based portal.

As used herein, a portal is a Web "super-site" providing access to a variety of integrated services including, for example, Web searching, news, white and yellow pages directories, e-mail, discussion groups, online shopping and hyperlinks to other Web sites. A portal is the Web equivalent of the original integrated online services such as CompuServe and AOL. Although the term portal initially referred to general-purpose Web sites, it now commonly refers to vertical market Web sites offering related services to a particular industry such as banking, insurance or computers. In this sense, the present invention relates to a portal for a building.

Each user of system 100 falls into a predefined role. Each role provides specific functionality as described below. User roles include, for example, super administrator, building administrator, tenant administrator, office administrator, office user, vendor administrator, vendor user, and anonymous user.

By default, host 115 is configured to allow access of a user corresponding to the anonymous user role through a Web client 105 via the Internet 110. The anonymous user role allows public access to the portal. Host 115 further provides a home page for an anonymous user to access (refer to FIG. 3).

By default, host 115 is configured to allow access of a user corresponding to the super administrator role through a Web client 105 via the Internet 110. In particular, database server 130 contains a user name and password for a super administrator. Host 115 provides a home page for a super administrator to access (refer again to FIG. 3).

Figure 2A:
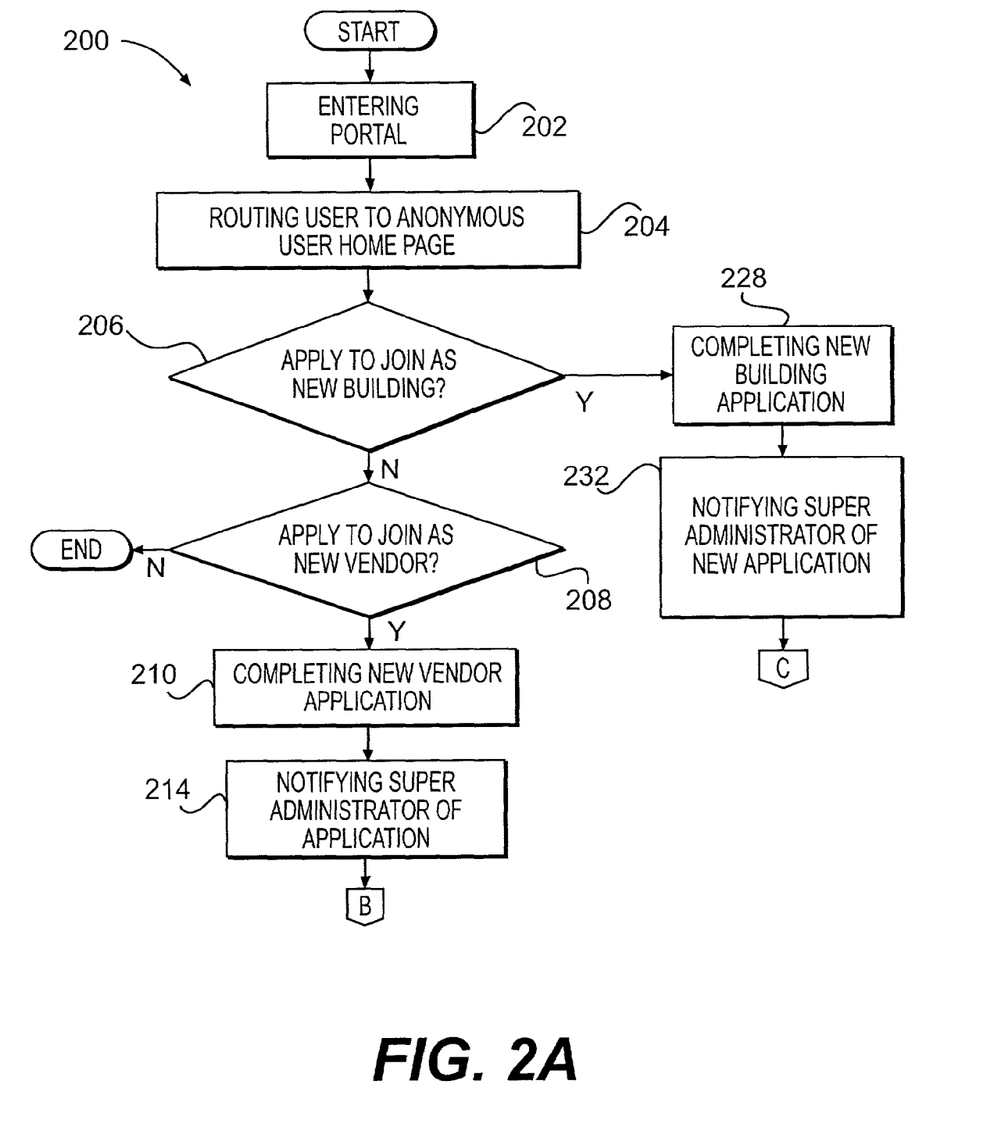
FIG. 2A-C are schematic representations of a process for creating a building network portal for targeting advertisements to tenants in a building according to a preferred embodiment of the present invention.
Figure 2B:
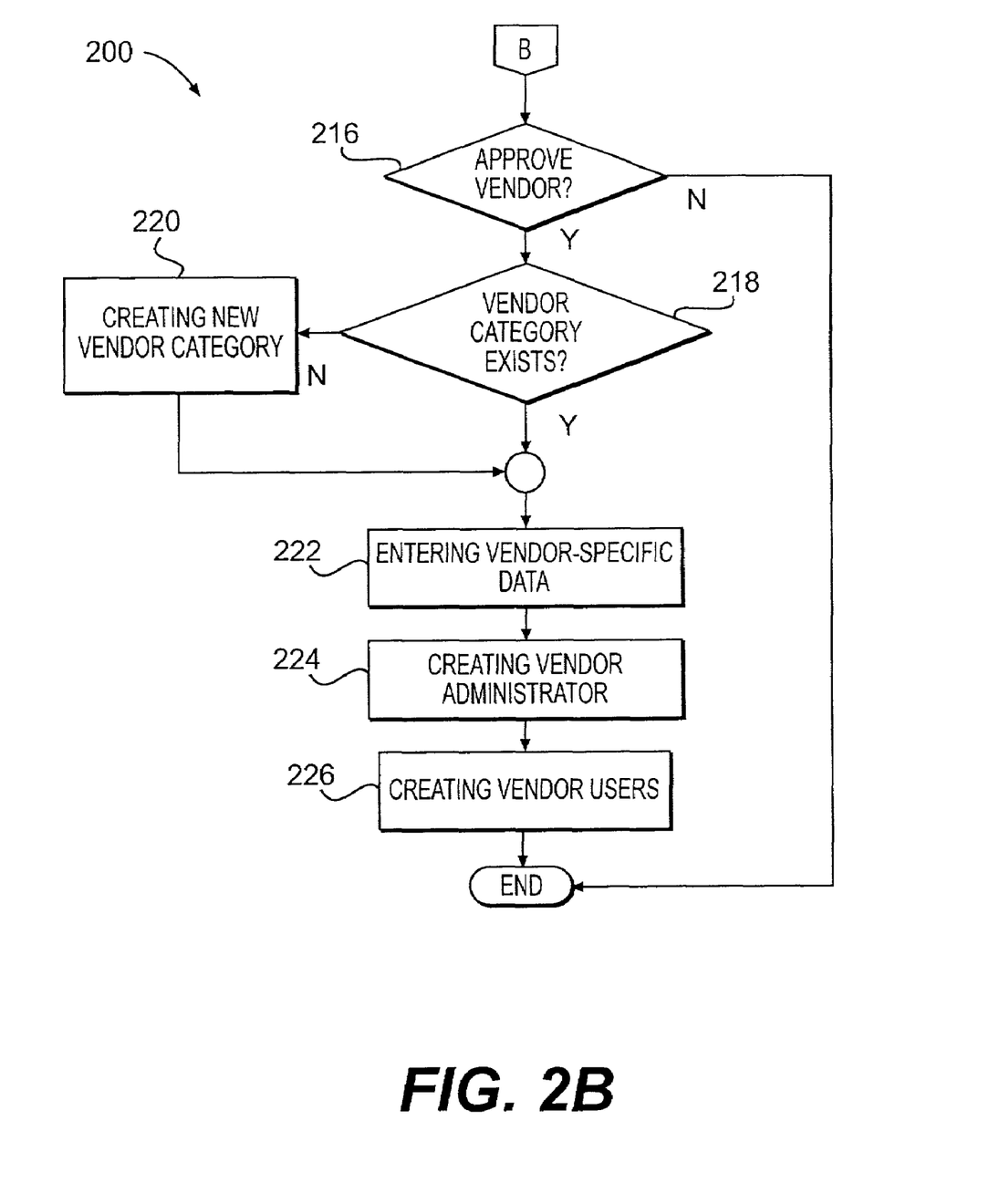
Figure 2C:
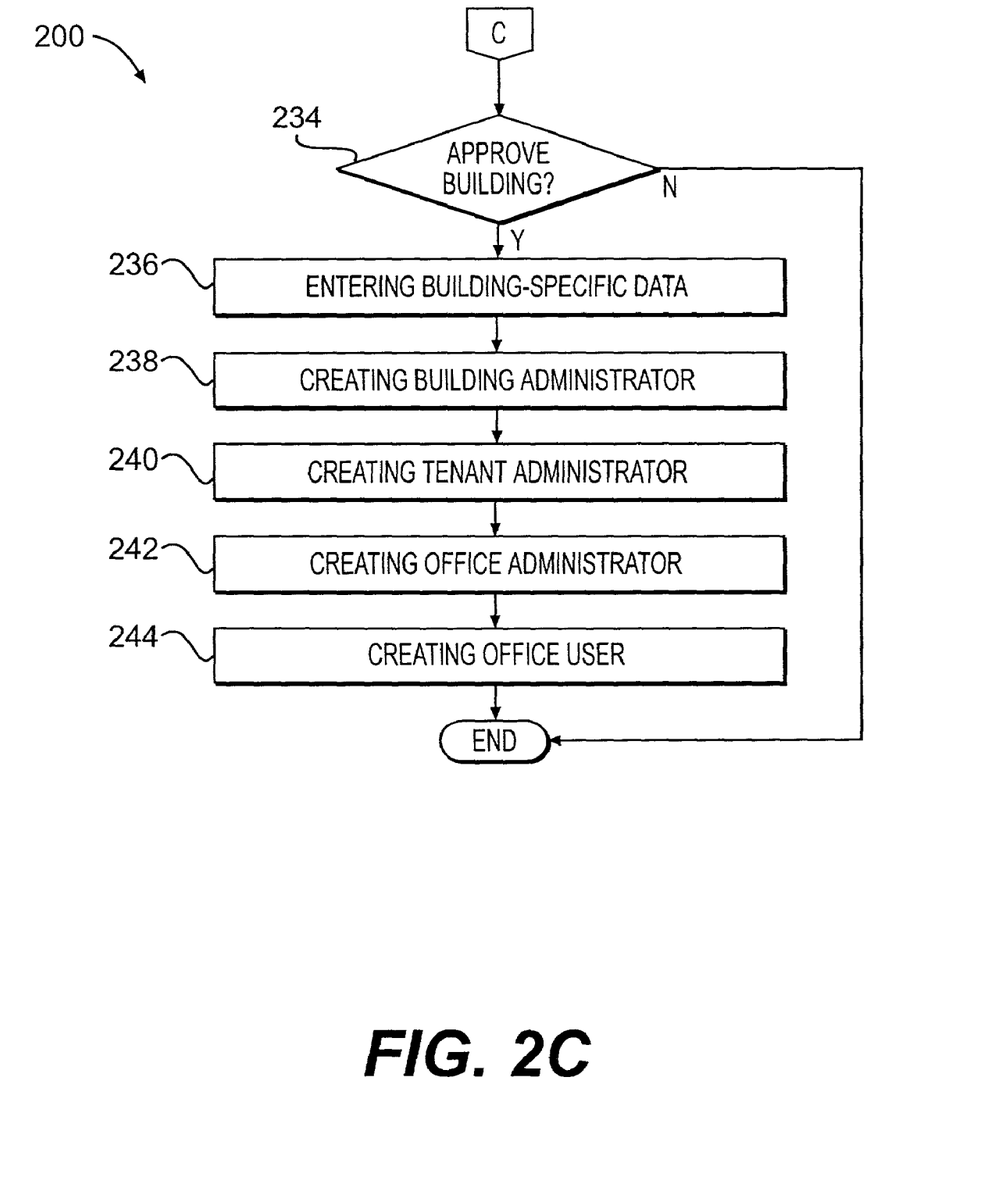

Through their home page, a super administrator can perform any function of the system 100 and is responsible for managing all aspects of the system 100. This includes the management of certain aspects of all other users of the system 100. When creating a new user, the super administrator enters data into the database server 130 including the following data elements:

E-mail address (doubles as a user name)
    Temporary password (user is asked to pick a new password upon first login to the system)
    User role
    Password hint
    First name
    Middle Name/Initial
    Last name
    Company
    Department
    Title
    E-mail
    Home Phone
    Work Phone
    Mobile Phone
    Pager
    Fax
    Address 1
    Address 2
    City
    State
    Zip
    Gender
    Birth date
    Marital Status
    Number of children
    Income bracket
    Education level Referring to FIGS. 2 A-C, a process 200 for creating a portal for a building includes:

Step 202: Entering Portal (FIG. 2A)

In step 202 (note FIG. 2A), a user enters the portal residing on host 115 through a Web client 105 and the Internet 110. In particular, a user accesses the portal by entering the uniform resource locator (URL) of the portal into a browser on their Web client 105. By default, host 115 assigns the anonymous user role to the user.

For reasons of simplicity, this step refers to the term portal although the state of the portal is not yet fully built out.

Step 204: Routing User to Anonymous User Home Page

In step 204, the user is routed to an anonymous user home page residing on the host 115 via a hyperlink on the portal.

Step 206: Apply to Join as New Building?

In step 206, the anonymous user decides whether to join as a new building. If yes, then the process 200 proceeds to step 228; if no, then the process 200 proceeds to step 208.

Step 208: Apply to Join as New Vendor?

In step 208, the anonymous user decides whether to join as a new vendor. If yes, then the process 200 proceeds to step 210; if no, then the process 200 terminates.

Step 210: Completing New Vendor Application

In step 210, the anonymous user completes a new vendor application by entering required data into the fields of an online new vendor application form. The anonymous user enters data into the database server 130 including the following data elements:

Contact Name
    Contact Information
    Vendor name
    Vendor Description
    Vendor category The database server 130 associates a unique identification (ID) code with the data.

Step 214: Notifying Super Administrator of Application

In step 214, the process 200 notifies the super administrator of the application for a new vendor via an e-mail message containing a hyperlink to the portal and the ID code assigned in step 210. The super administrator logs onto the portal as described in connection with FIG. 3 below. From their home page, the super administrator enters the ID code into a text field and submits the ID code to the host 115. The host 115 then serves a Web page containing the new vendor application data entered in step 210.

Step 216: Approve Vendor? (FIG. 2B)

In step 216 (note FIG. 2B), the super administrator reviews the new vendor application data and decides whether to approve the new vendor. If yes, then the process 200 proceeds to step 218; otherwise, the process 200 terminates. If approved, the super administrator will contact the vendor representative identified in step 210 directly via phone in order to work out any specific details associated with the approval.

Step 218: Vendor Category Exists?

In step 218, the super administrator determines if a vendor category exists for the new vendor. In particular, the super administrator searches the database server 130 to determine if a record containing the appropriate vendor category exists. Vendor categories include those used by users of office buildings, such as food service, limousine service, office supplies, and the like. If no, then the process 200 proceeds to step 220; if yes, then the process 200 proceeds to step 222.

Step 220: Creating New Vendor Category

In step 220, the super administrator creates a new vendor category in the database server 130 corresponding to the new vendor. In particular, the super administrator can add, edit, and remove categories of vendors in the database server 130. All vendors will fall into specific categories (e.g., cleaning service, office supplies, and furniture). Vendor categories affect the way vendors are depicted on-screen and help determine which vendors are appropriate for which buildings. When adding a vendor category, the super administrator enters data into the database server 130 including the following data elements:

Category Name
    Category Description Step 222: Entering Vendor-Specific data In step 222, the super administrator enters data into the database server 130 including the following vendor-specific data elements:

Name
    Vendor Category
    Short description
    Long description
    Address 1
    Address 2
    city
    State
    Zip Main phone number
Primary contact
Primary contact phone number
Optionally, the super administrator can enter data into the database server 130 including the following data elements:
Primary contact e-mail
Primary contact fax
Secondary contact
Secondary contact phone
Secondary contact e-mail
Secondary contact fax
Website URL
Logo
Global specials
Tenant specials
Union status Step 224: Creating Vendor Administrator In step 224, the super administrator configures the host 115 to allow access of a user corresponding to the vendor administrator role through a Web client 105 via the Internet 110. In particular, the super administrator creates an e-mail account for a vendor administrator on host 115. The super administrator then stores a user name and temporary password in the database server 130 corresponding to the vendor administrator. The super administrator then sends an e-mail message to the e-mail account of the vendor administrator. The e-mail message contains the temporary password, a hyperlink to the portal, and directions for accessing the new user's home page (refer to FIG. 3).

Through their home page, a vendor administrator presents products and services to users of system 100 and manages orders of products and services requested by users of the system 100. In particular, a vendor administrator typically views pending orders, sets the status of orders, and downloads order information in a spreadsheet format. The system 100 allows a vendor administrator to group orders by tenant, building, date, order status, or any combination thereof.

Step 226: Creating Vendor Users

In step 226, the super administrator configures the host 115 to allow access of a user corresponding to the vendor user role through a Web client 105 via the Internet 110. In particular, the super administrator creates an e-mail account for a vendor user on the host 115. The super administrator then stores a user name and temporary password in the database server 130 corresponding to the vendor user. The super administrator then sends an e-mail message to the e-mail account of the vendor user. The e-mail message contains the temporary password, a hyperlink to the portal, and directions for accessing the new user's home page (refer again to FIG. 3).

Through their home page, a vendor user assists the vendor administrator in managing orders requested by users of the system 100. In particular, a vendor user has the capability to view pending orders, set order status, and download order information in a spreadsheet format. The configuration of host 115 allows a vendor user to group orders by tenant, building, date, order status, or any combination thereof.

Alternatively, a vendor administrator may create a vendor user by following the same steps of the super administrator as described above. In step 226, the vendor administrator configures the host 115 to allow access of a user corresponding to the vendor user role through a Web client 105 via the Internet 110. In particular, the super administrator creates an e-mail account for a vendor user on the host 115. The vendor administrator then stores a user name and temporary password in the database server 130 corresponding to the vendor user. The vendor administrator then sends an e-mail message to the e-mail account of the vendor user. The e-mail message contains the temporary password, a hyperlink to the portal, and directions for accessing the new user's home page (refer again to FIG. 3).

Step 228: Completing New Building Application (FIG. 2A)

In step 228 (note again FIG. 2A), the anonymous user completes a new building application by entering required data into the fields of an online new building application form. An anonymous user requesting to join as a new building would likely be a representative of a building management organization (BMO) or a building owner.

The anonymous user enters data into the database server 130 including the following data elements:
Name
Contact Information
Building name
Building address Database server 130 associates a unique ID code with the data.

Step 232: Notify Super Administrator of Application

In step 232, the process 200 notifies the super administrator of the application for a new building via an e-mail message containing a hyperlink to the portal and the previously assigned ID code assigned in step 228. The super administrator logs onto the portal as described in connection with FIG. 3. From their home page, the super administrator enters the ID code into a text field and submits the ID code to the host 115. The host 115 then serves a Web page containing the new building application data entered in step 228.

Step 234: Approve Building? (FIG. 2C)

In step 234 (note FIG. 2C), the super administrator decides whether to approve the new building. If yes, then the process 200 proceeds to step 236; if no, the process 200 terminates. If approved, the super administrator will contact the building representative identified in step 228 directly via a phone in order to work out any specific details associated with the approval.

Step 236: Entering Building-Specific Data

In step 236, the super administrator enters data into the database server 130 including the following data elements:
Address 1
Address 2
City
State
Zip
Tenants
  Company Name
  Description
  Business Type In particular, a tenant is an organization that rents space within a building.

Step 238: Creating Building Administrator

In step 238, the super administrator configures the host 115 to allow access of a user corresponding to the building administrator role through a Web client 105 via the Internet 110. In particular, the super administrator creates an e-mail account for a building administrator on the host 115. The super administrator then stores a user name and temporary password in the database server 130 corresponding to the building administrator. The super administrator then sends an e-mail message to the e-mail account of the building administrator. The e-mail message contains the temporary password, a hyperlink to the portal, and directions for accessing the new user's home page (refer to FIG. 3).

Through their home page, a building administrator enters data into the database server 130 including the following building-related data elements:

Address
Name (of the building)
Owner
Photo
Square Feet
Floors
Elevators
Date built
Parking
Hours of operation
Freight hours
Delivery hours
Delivery rules
Rules+Regulations
Work Rules
Work Regulations
Union status
Managing Agent
   Name
   Address
   Phone/Fax
   E-mail
   Contact
Staff
   Building Manager
   Assistant Building Manager
   Concierge
   Engineers
   Porters
   Fire Safety Director(s)
Leasing Agent
   Name
   Address
   Phone/Fax
   E-mail
   Contact
Cleaning Contractor
   Name
   Address
   Phone/Fax
   E-mail
   Contact
Has parking?
Can use roof?
Loading dock
Fire contact
EMS Contact
Police contact
Type of security system
Management company
Available space
   Each available space entry must specify the floor number, square footage, and a description of the space.
Vendors
   The building administrator selects appropriate vendors from a global collection of vendors in the database server 130 and makes them available to the users in a particular building. By default, all vendors will be available to all users in the building.

A super administrator repeats this step as needed to create additional building administrators.

Step 240: Creating Tenant Administrator

In step 240, the building administrator configures the host 115 to allow access of a user corresponding to the tenant administrator role through a Web client 105 via the Internet 110. In particular, the building administrator creates an e-mail account for a tenant administrator on the host 115. The building administrator then stores a user name and temporary password in the database server 130 corresponding to the tenant administrator. The building administrator then sends an e-mail message to the e-mail account of the tenant administrator. The e-mail message contains the temporary password, a hyperlink to the portal, and directions for accessing the new user's home page (refer to FIG. 3).

Since tenants may span multiple buildings, this role is reserved for a tenant employee who is capable of making corporate-wide (not office-wide) decisions about purchasing, vendor relationships, etc.

A building administrator repeats this step as needed to create additional tenant administrators.

Step 242: Creating Office Administrator

In step 242, the tenant administrator configures the host 115 to allow access of a user corresponding to the office administrator role through a Web client 105 via the Internet 110. In particular, the tenant administrator creates an e-mail account for an office administrator on the host 115. The tenant administrator then stores a user name and temporary password in the database server 130 corresponding to the office administrator. The tenant administrator then sends an e-mail message to the e-mail account of the office administrator. The e-mail message contains the temporary password, a hyperlink to the portal, and directions for accessing the new user's home page (refer to FIG. 3).

Through their home page, an office administrator enters data corresponding to their particular office into the database server 130, including the following data elements:

Contact Information
   Facility Manager Contact Information
   Purchasing Manager Contact Information
   Number of employees
   Internet access speed
   Number of computers
   Fire Warden
   Location of office within building Although a building administrator or tenant administrator can also accomplish this task, it is likely that an office administrator will be in the best position to answer these office-specific questions.

Through their home page, a tenant administrator defines a set of purchasing rules for each office administrator created and stores these rules in the database server 130. For each office administrator created and each vendor the building administrator made available to the building in step 238, the tenant administrator enters data into the database server 130 including the following data elements:

Include hyperlink to vendor's home page on office administrator's home page?
      By default, hyperlinks to all of the vendors made available to a particular building will be included on each office administrator's home page.
   Maximum purchase amount the office administrator can make without approval.
      By default, all office administrators will have the capability to make purchases without approval up to a predetermined amount.

Vendor-specific purchasing rules.
> For example, a specific limousine service may only be made available to users after 6:00 PM on weekdays.

Automatic order completion confirmation?
> The tenant administrator determines which vendors require order completion confirmation. For limousine service, or food orders, or other services where the tenant administrator's manual confirmation is not necessary, the tenant administrator selects automatic order completion confirmation.

From their home page, an office administrator periodically views a list of all pending orders generated from users within their particular office. The office administrator views orders based on status (pending, completed, delayed, backordered, out-of-stock, unavailable), date of the order, vendor, or the user generating the order. The office administrator can then generate a printable report or download the data in spreadsheet format for further processing in Excel® or a similar application.

A tenant administrator repeats this step as needed to create additional office administrators.

Step 244: Creating Office Users

In step 244, the office administrator configures the host 115 to allow access of a user corresponding to the office user role through a Web client 105 via the Internet 110. In particular, the office administrator creates an e-mail account for an office user on the host 115. The office administrator then stores a user name and temporary password in the database server 130 corresponding to the office user. The office administrator then sends an e-mail message to the e-mail account of the office user. The e-mail message contains the temporary password, a hyperlink to the portal, and directions for accessing the new user's home page (refer to FIG. 3).

Through their home page, the office administrator enters data into the database server 130 including the following data elements related to the new office user:
 E-mail address
 First name
 Last name
 ID (e.g., birthday, or last 4 digits of social security number)

Through their home page, an office administrator defines a set of purchasing rules for the office user created and stores these rules in the database server 130. For the office user created and each vendor the tenant administrator made available to the office administrator, the office administrator enters data into the database server 130 including the following data elements:
 Include hyperlink to vendor's home page on office user's home page?
 > By default, hyperlinks to all of the vendors made available to a particular building will be included on the office user's home page.

Maximum purchase amount the office user can make without approval.
 > By default, the office user will have the capability to make purchases without approval up to a predetermined amount.

Vendor-specific purchasing rules.
 > For example, a specific limousine service may only be made available to users after 6:00 PM on weekdays.

To further facilitate the process of creating purchasing rules for an office user, the system 100 allows an office administrator to create purchasing classes and assign an office user to a specific purchasing class. In particular, the host 115 allows an office administrator to create a new purchasing class and assign a specific set of purchasing rules to that purchasing class. For example, one purchasing class may contain a rule that allows the ordering of limousine service only after 6:00 PM, whereas another purchasing class may contain a rule that allows the ordering of limousine service at any time. This information is stored in the database server 130.

An office administrator repeats this step as needed to create additional office users.

Easy as this may be, it would still be tedious for an office administrator to set up an office of 1,000 employees using this method. Therefore, the system 100 allows an office administrator to automatically create a large group of new users by storing in the database server 130 a file containing a list of e-mail addresses. This data is easily accessible since many offices already have a list of employees in spreadsheet or database format. The database server 130 automatically sends an e-mail message to each e-mail address listed. Each e-mail message contains a unique temporary password and a hyperlink to the portal.

Through their home page, an office user orders commercial products and services from any vendor made available to them. In addition, an office user periodically views a list of all pending orders to determine when a particular service has been fulfilled or a product has been delivered.

Figure 3:
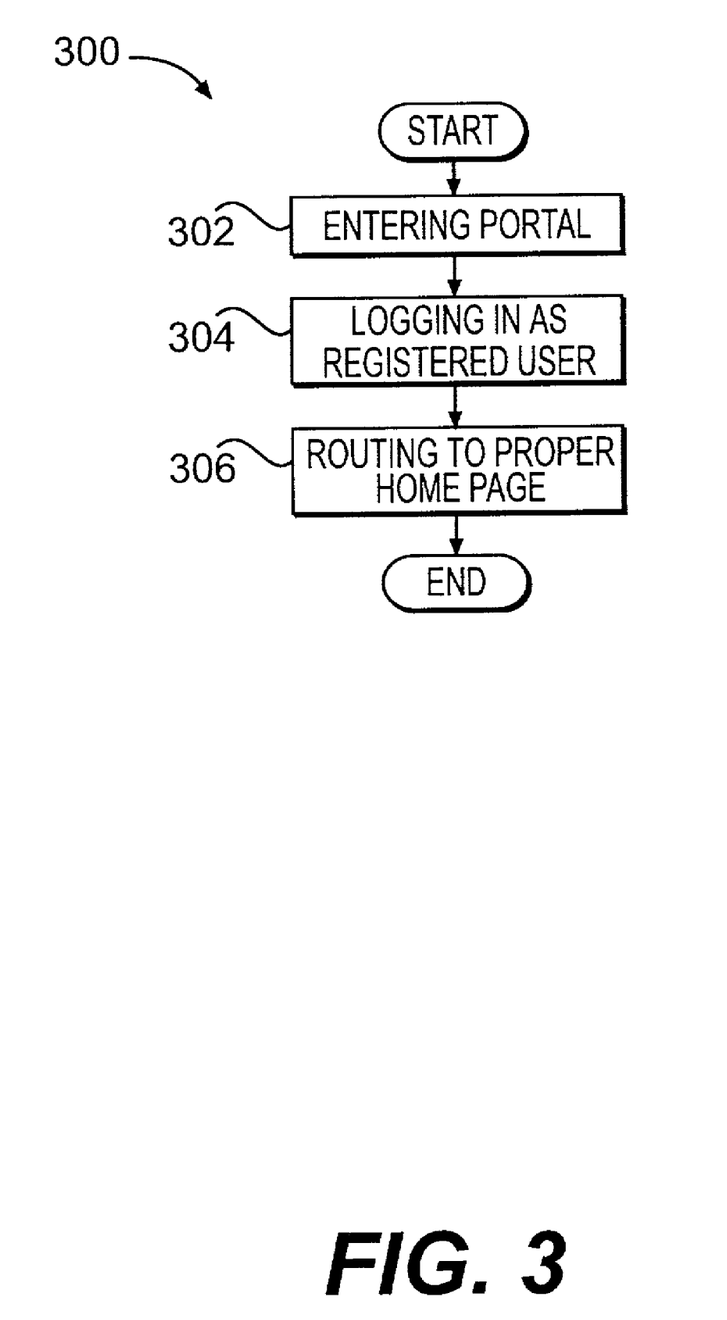
FIG. 3 is a schematic depiction of a process for accessing a user home page according to a preferred embodiment of the present invention.

Referring to FIG. 3, a process 300 for accessing a user home page comprises the following steps.

Step 302: Entering Portal

In step 302, a user enters a portal residing on the host 115 through a Web client 105 and the Internet 110. In particular, a user accesses the portal by entering the uniform resource locator (URL) of the portal into the browser on their Web client 105.

Step 304: Logging in as Registered User

In step 304, the process 300 allows a user to register using a predefined user name and password. In particular, the user enters a user name and password into a login Web page on the portal. The host 115 authenticates the user name and password. In the event that a new user attempts to register with a temporary password, host 115 prompts the new user to pick a new password and fill out the remainder of his or her profile.

Step 306: Routing to Proper Home Page

In step 306, the process 300 routes the user to the home page corresponding to the user name of the user entered in step 304. The host 115 automatically creates a new user home page for a new user. A home page may consist of several pages specifically customized with the user's information.

For example, a user having a role corresponding to an office user would enter a user name and a corresponding password into the appropriate fields within a Web page on the Web client 105. The host 115 then routes the Web browser on the Web client 105 to the home page of the office user.

Figure 4:
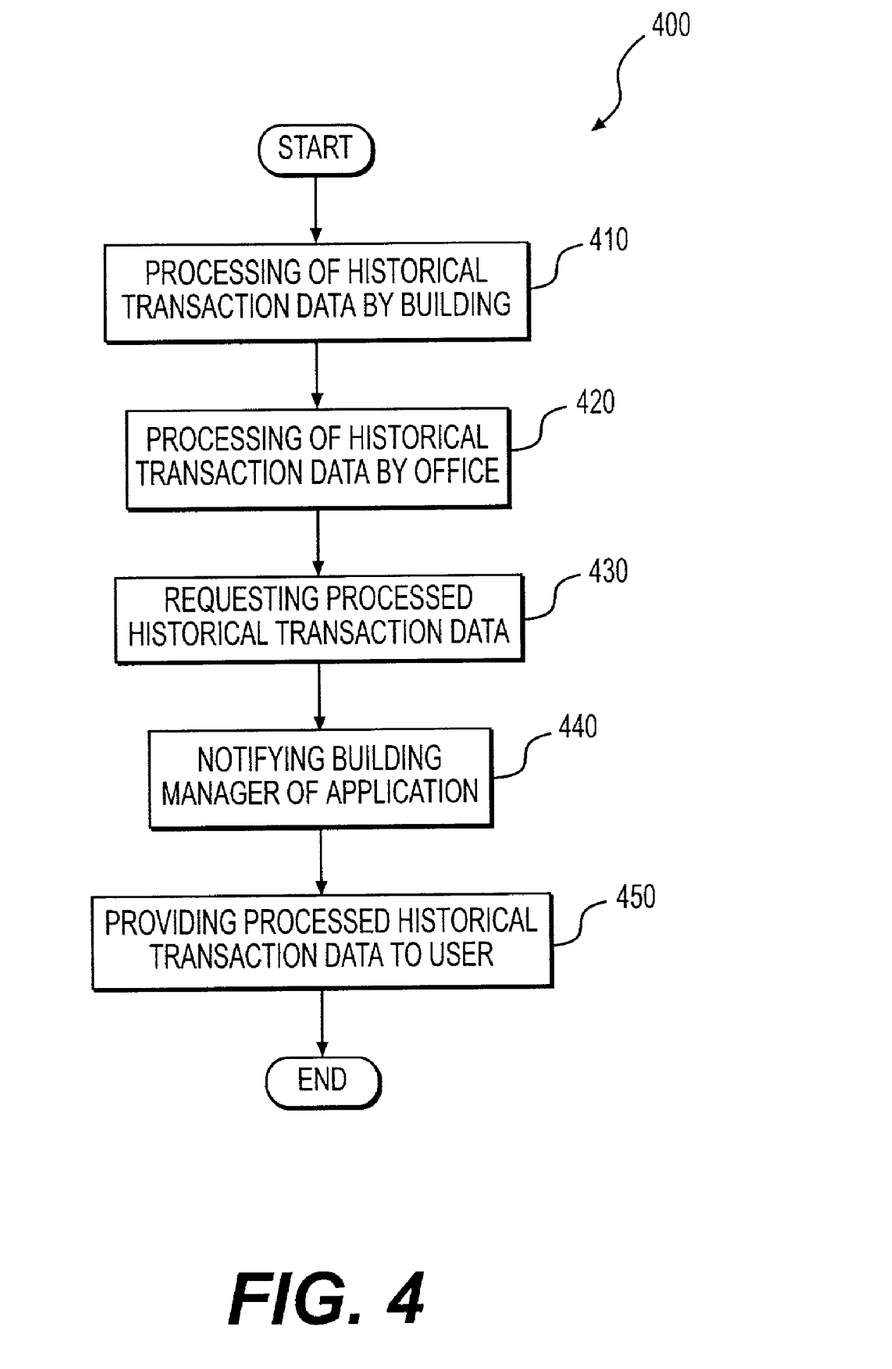
FIG. 4 is a schematic representation of a process for processing historical transaction data and providing the data according to a preferred embodiment of the present invention.

Referring to FIG. 4, the following describes a process for processing historical transaction data and providing the data. The process 400 comprises the following steps.

Step 410: Processing of Historical Transaction Data by Building

In step 410, the database server 130 performs the following substeps:

(a) Retrieves all historical transaction data residing in the database server 130 for a particular building that transacted for products and services over a predetermined period of time. This historical transaction data is previously stored in the database 130 at the time of each transaction by a user associated with the building for a product or service offered by a vendor. In addition to identifying the vendor, the requesting user enters data into the database server 130 including the following data elements:

Service date
Service details
Product ID number (e.g., SKU, UPC)
Product quantity (b) Sorts the retrieved data using the SKU code as the primary sort key.

(c) Creates a table that totals each SKU classification in the sorted data.

(d) Stores the totaled SKU-classification table in the database server 130.

In an alternative embodiment, the building network system 100 stores a code other than the SKU code, e.g., a UPC, EAN or JAN code, and such code is used instead of the SKU code in step 410.

Step 420: Processing of Historical Transaction Data by Tenant

In step 420, the database server 130 performs the following substeps:

(a) Retrieves all historical transaction data residing in the database server 130 for a particular tenant that transacted over a predetermined period of time. This historical transaction data was previously stored in the database 130 at the time of each transaction. (Refer to step 410, above.)

(b) Sorts the retrieved data using the transacting tenant as the primary sort key and the SKU code as the secondary sort key.

(c) Creates a table for each tenant in the particular building that totals each SKU classification in the sorted data.

(d) Stores the totaled office-SKU-classification tables in the database server 130.

Step 430: Requesting Processed Historical Transaction Data

In step 430, a user requests processed historical transaction data. In particular, the user performs the following substeps:

(a) Performs the process 300 to access their user home page. (Refer again to FIG. 3.)

(b) Enters a historical-transaction-data-request page residing on the host 115 through a hyperlink on the user's home page. An application form for requesting processed historical transaction data is displayed on the historical-transaction-data-request page.

(c) Fills in the application form. In particular, the user enters data into the database server 130 via the application form, including the following data elements:

Name
Contact Information
Desired historical transaction data (by building, by tenant, by both)

The database server 130 associates a unique ID code with the stored data.

Step 440: Notifying Building Manager of Application

In step 440, the building manager or administrator is notified of the application for historical transaction data via an e-mail message containing a link to the portal and the previously assigned ID code. Upon receipt of the e-mail, the building manager or administrator logs onto the portal as described in process 300 above (refer also to FIG. 3) and reviews the data contained in the database server 130 for the historical transaction data application form.

Step 450: Providing Processed Historical Transaction Data to User

In step 450, the building manager or administrator provides the requesting user with the processed historical transaction data applied for in the application in step 430. A variety of methods may be employed to provide the data to the user. For example, the data could be e-mailed to the user, copied onto a floppy disk and mail delivered, made available to the user through a hyperlink on the user home page, and the like. The process 400 terminates after step 450.

Although the building manager or administrator administers the processing of historical transaction data in the process 400, a user other than the building manager or administrator could perform such processing, such as the super administrator.

In an alternative embodiment, the building network system 100 stores a code other than the SKU code, e.g., a UPC, EAN or JAN code, and such code is used instead of the SKU code as described in the process 400.

In another embodiment, historical transaction data could also be processed and provided based on other data elements or fields such as the number of employees, floor number, and title of ordering user (partner, secretary, paralegal, etc.).

Figure 5:
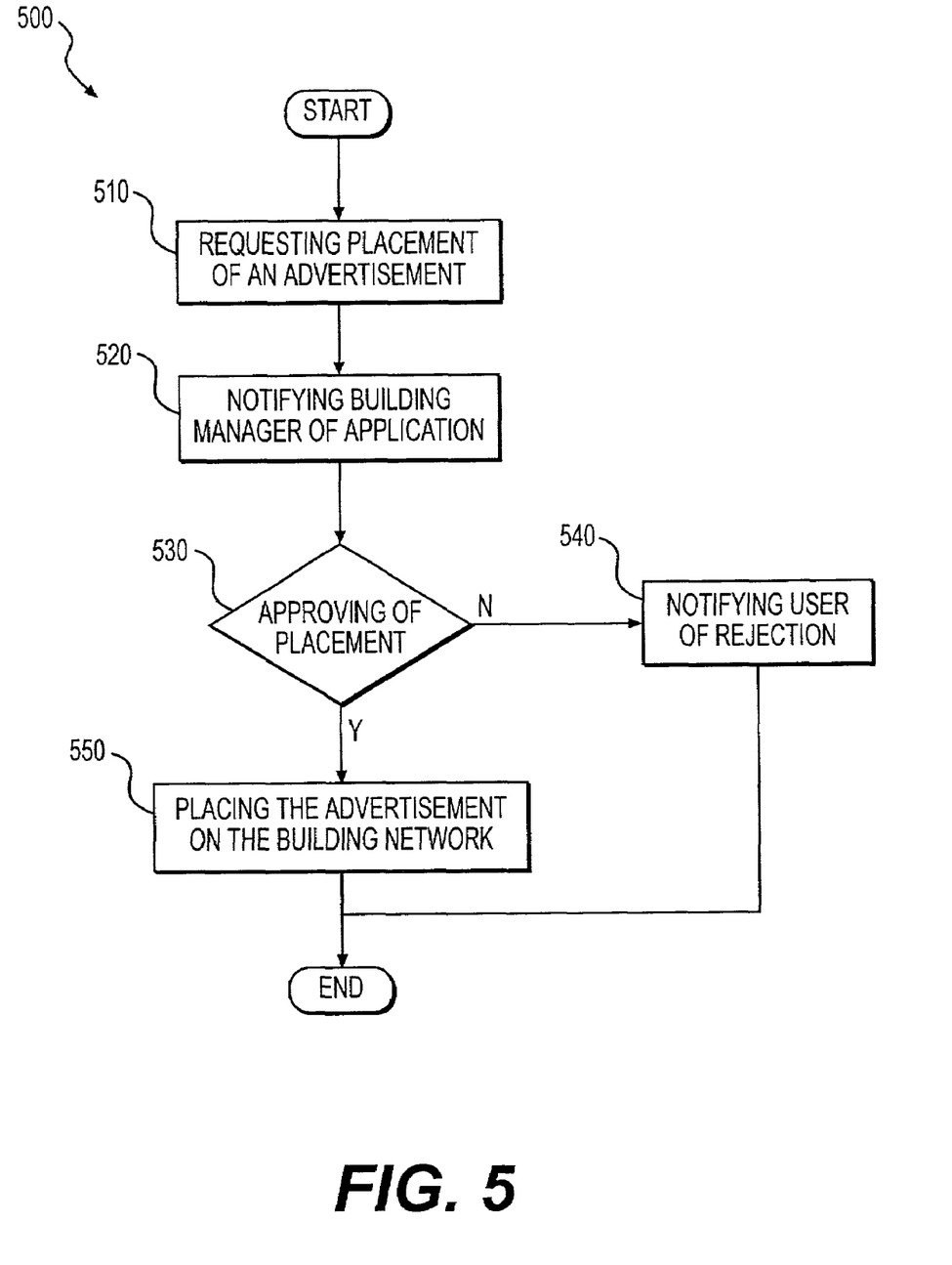
FIG. 5 shows schematically a process for placing targeted advertisements in a building according to a preferred embodiment of the present invention.

FIG. 5 depicts a process for placing targeted advertisements in a building according to the present invention. The process 500 includes the following steps.

Step 510: Requesting Placement of an Advertisement

In step 510, a user requests the placement of an advertisement from the building manager. To make this request, the user performs the following substeps:

(a) Performs the process 300 to access their user home page. (Refer again to FIG. 3.)

(b) Enters an advertisement-placement-request page residing on the host 115 through a hyperlink on the user's home page. An application form for placement of an advertisement is displayed on the advertisement-placement-request page.

(c) Fills in the application form. In particular, the user enters data into the database server 130 via the application form, including the following data elements:

Name
Contact Information
Target audience (building-wide or specified tenants)
    The user specifies the target audience based either (i) on the historical transaction data they may have received in the process 400 described above, or (ii) on some other factors such as independent judgment or other information sources.
Brief description of the advertisement to be placed
Periodicity of placement of the advertisement When storing the data, the database server 130 associates a unique ID code with the data.

(d) Provides the advertisement to be placed. This can be accomplished in any number of ways. For example, the user could paste a graphic image of the advertisement into a field on the application form, the user could e-mail a graphic image file of the advertisement to the building manager or administrator, the user could mail deliver a hard copy of the advertisement to the building manager or administrator (who would scan the hard copy to create a graphic image), and the like.

Step 520: Notifying Building Manager of Application

In step 520, the building manager or administrator is notified of the application for placement of an advertisement via an e-mail message containing a link to the portal and the previously assigned ID code. Upon receipt of the e-mail, the building manager logs onto the portal as described in the process 300 above (refer also to FIG. 3) and reviews the data contained in the database server 130 for the advertisement placement application form.

Step 530: Approving of Placement

In step 530, the building manager or administrator decides whether to approve the request for placement of an advertisement. One reason a building manager or administrator might reject a request for the placement of an advertisement is, for example, because of unacceptable content.

If yes, then the process 500 proceeds to step 550; if no, then the process 500 proceeds to step 540.

Step 540: Notifying User of Rejection

In step 540, the host 115 sends a rejection notification to the user via e-mail.

Step 550: Placing the Advertisement on the Building Network

In step 550, the host 115 places the advertisement on the building network In particular, the host 115 places the advertisement on the home pages of the building network in accordance with the target audience specified by the user in step 510. For example, if the user specifies tenant XYZ in the building, the host 115 places the advertisement on each user's home page of tenant XYZ by inserting on each of the home pages the graphic image of the advertisement. The process 500 terminates after step 550.

Although the process 500 above is directed to the placement of advertisements by users on a building network, users could also take the processed historical transaction data provided to them in the process 400 above and instead place their advertisements through other channels, such as e-mail, facsimile transmission, mail delivery and other traditional media such as local radio and television broadcasting.

In addition, data stored in the database server 130 other than the historical transaction data could also be provided to a user for the purpose of selecting a target audience for the placement of advertisements. For example, users in the building network could be demographically profiled based on other data stored in the database server 130, such as birth date, marital status, number of children, income bracket and education level (refer to the list of data entered by the super administrator when creating a new user as described above), company name, description and business type (refer to step 236 above), square feet in office (refer to step 238 above), and the like.

Although the above description of the present invention is directed to a network provided in a building, it can be appreciated that the present invention could also be applied to any type of facility such as a hotel, university campus, government complex, airport, shipping port, factory, amusement park, shopping mall or cruise ship. Further, the present invention could also be applied to a geographical area such as a park containing dispersed facilities, and a body of water whereon ships are dispersed.

Summary of Major Advantages of the Invention

After reading and understanding the foregoing description of preferred embodiments of the invention, in conjunction with the illustrative drawings, it will be appreciated that several distinct advantages of the subject system and method for targeting advertisements to tenants in a building are obtained.

One advantage of the present invention is a portal designed to suit the specific needs of a particular building. The portal provides a convenient, integrated location for targeting advertisements to tenants in a building by vendors of commercial products and services.

Another advantage of the present invention is a way to automatically differentiate tenants in a building and particular buildings in a building network.

Yet another advantage of the present invention is that it saves time, money, and effort by reducing the time spent in targeting advertisements to particular tenants in a particular building.

Another advantage of the present invention is that it provides for the distribution of an advertisement to a targeted audience in a particular building.

Another advantage of the present invention is that it provides building owners and managers with the opportunity to generate revenue through fees collected from advertisers, as well as through enhanced sales through posting of advertisements for their own goods and services, e.g., special cleaning services for offices, etc.

In accordance with the foregoing, the present invention provides a system and method for targeting advertisements to tenants in a building.

A building is a physical location run by a building management organization (BMO). One building houses many tenants, each tenant occupying one or more unit in the building, and offers the services and products of many vendors.

A portal is a Web "super-site" providing access to a variety of integrated services including, for example, Web searching, news, white and yellow pages directories, e-mail, discussion groups, online shopping and hyperlinks to other Web sites. A portal is the Web equivalent of the original integrated online services such as CompuServe and AOL. Although the term portal initially referred to general-purpose Web sites, it now commonly refers to vertical market Web sites offering related services to a particular industry such as banking, insurance or computers. In this sense, the present invention relates to a portal for a building.

A first aspect of the present invention is a building network system for targeting advertisements to particular tenants in a particular building through a portal designed to suit the specific building.

A second aspect of the present invention is a process of using the building network system to create a portal designed to suit a particular building for targeting advertisements to tenants in the building.

A third aspect of the present invention is a process of using the portal to distribute targeted advertisements to tenants in the building.

A fourth aspect of the present invention is a process of using the building network system for processing historical transaction data and providing the data through the portal.

A fifth aspect of the present invention is carrying out the processes according to the present invention in a computer.

A sixth aspect of the present invention is a computer system capable of carrying out the processes according to the present invention.

In describing the invention, reference has been made to preferred embodiments and illustrative advantages of the invention. Those skilled in the art, however, and familiar with the instant disclosure of the subject invention, may recognize additions, deletions, modifications, substitutions and other changes that fall within the purview of the subject invention.

What is claimed:

1. A method for targeting advertisements to tenants in a building, said method under the control of a manager, the method comprising the steps of:

providing a portal for a building, said portal accessible via the Internet;

wherein providing a portal for a building includes the step of:

providing a user with access to an anonymous user home page;

determining whether said user is one of an advertiser or a tenant, each tenant and each advertiser being uniquely identified and having a specific user role with respect to said portal for the building;

receiving data input by said user with respect to a user profile; and processing via said portal said data to create one of a building user home page or a vendor user home page for the user, providing a personalized home page for each tenant and each advertiser;

associating at least one advertiser with said portal for the building;

receiving at least one request from at least one advertiser to place an advertisement on said portal, wherein the advertisement is targeted at a selected group of tenants in said building, said selected group of tenants being selected by the advertiser;

wherein said step of receiving at least one request to place an advertisement includes the steps of:

receiving a request from at least one advertiser for historical transaction data, wherein said historical transaction data includes one or more of data processed by collective users of the building and/or data processed by tenant and one or more data regarding prior orders placed for products or services via the portal;

providing said advertiser with the requested historical transaction data, wherein said targeted tenants in the building are determined based on said historical transaction data;

the manager selectively granting said at least one request from said at least one advertiser to place said advertisement on said portal; and upon the manager granting said at least one request, posting said advertisement on said portal for said building such that the advertisement is viewable by said selected group of tenants and not by other tenants of the building.

2. The method for targeting advertisements to tenants in a building as defined in claim 1, wherein said building is a building network.

3. The method of claim 1, wherein the selected group of tenants includes all the tenants of said building.

4. A method for controlling the advertisements viewable to tenants and services and products purchases by the tenants in a building, said method under the control of a manager, the method comprising the steps of:

providing a portal for a building, said portal accessible via the Internet by a plurality of tenants of said building;

providing a home page for each tenant and each advertiser; each tenant and each advertiser being uniquely identified and having a specific user role with respect to said portal for the building;

providing a plurality of categories of advertisers;

associating at least one advertiser with said portal for the building;

identifying one or more of said categories which the advertiser qualifies under;

receiving at least one request from the advertiser to place an advertisement on said portal, wherein the advertisement is targeted at a selected group of tenants in said building selected by the advertiser;

receiving a request from at least one advertiser for historical transaction data and providing said advertiser with the requested historical transaction data, wherein said historical transaction data is one or more of data processed by collective users of the building and/or data processed by tenant;

the manager selectively granting the request from the advertiser to place the advertisement on said portal;

upon granting the request from the advertiser, posting said advertisement at said portal for said building such that the advertisement is viewable by said selected group of tenants and not by other tenants of the building;

creating via said portal one or more purchasing classes consisting of one or more tenants of the building, each purchasing class being able to purchase a list of products or services via the portal, at least two purchasing classes having a different list of products or services that the respective class can purchase;

assigning each of the tenants of the building to one or more purchasing classes;

permitting one tenant of said selected group of tenants to place an order with the advertiser if the order is for a product or service on the list for the respective purchasing class of the tenant.

5. The method for targeting advertisements to tenants as defined in claim 4, wherein said step of providing the requested historical transaction data includes the step of processing stored historical transaction data, said stored historical transaction data including data previously stored at the time of each transaction by a user of said portal.

6. The method for targeting advertisements to tenants in a building as defined in claim 4, wherein said step of providing a portal includes:

providing a user with access to an anonymous user home page;

determining whether said user is one of an advertiser or a tenant;

receiving data input by said user with respect to a user profile; and processing said data to create one of a building user home page and a vendor user home page.

7. The method of claim 4, wherein the historical transaction data includes prior orders placed for products or services via the portal.

8. The method of claim 4, wherein a first purchasing class is permitted to purchase a first product or service at a first specified time of day and prevented from purchasing the first product or service at a second specified time of day.

9. A method for controlling the advertisements viewable to tenants and services and products purchasing by the tenants in a building, said method under the control of a manager, the method comprising the steps of:

providing a portal for a building, said portal accessible via the Internet, wherein providing a portal for a building includes the step of:

providing a user with access to an anonymous user home page;

determining whether said user is one of an advertiser or a tenant, each tenant and each advertiser being uniquely identified and having a specific user role with respect to said portal for the building;

receiving data input by said user with respect to a user profile; and processing via said portal said data to create one of a building user home cage or a vendor user home cage for the user, providing a personalized home cage for each tenant and each advertiser;

creating a plurality of categories of advertisers, each category of advertisers having one or more purchasing requirements;

associating at least one advertiser with said portal for the building;

identifying one or more categories which the advertiser qualifies under;

receiving at least one request from at least one advertiser to place an advertisement on said portal, wherein the advertisement is targeted at a selected group of tenants in said building, and wherein said step of receiving at least one request to place an advertisement includes the steps of:

receiving a request from at least one advertiser for historical transaction data, wherein said historical transaction data includes one or more of data processed by collective users of the building and/or data processed by tenant and one or more data regarding prior orders placed for products or services via the portal;

providing said advertiser with the requested historical transaction data, wherein said targeted tenants in the building are determined based on said historical transaction data;

the manager selectively granting said at least one request from said at least one advertiser to place said advertisement on said portal; and in response to the grant from the manager, posting said advertisement at said portal for said building such that the advertisement is visible by the selected group of tenants and not the other tenants of said building;

receiving a request from a tenant from the selected group of tenants to place an order with the advertiser;

the manager selectively granting or denying the request to place the order, comprising determining whether or not the order fulfills the purchasing requirement of the advertiser category.

10. The method of claim 9, wherein according to the purchasing rules of the purchasing class, the tenant within the purchasing class is permitted to purchase a first product or service at a first specified time of day and prevented from purchasing the first product or service at a second specified time of day.

11. A method for controlling advertisements viewable to tenants and services and products purchased by the tenants in a building, the method comprising the steps of:

providing a portal for a building, said portal accessible via the Internet, wherein providing a portal for a building includes the step of:

providing a user with access to an anonymous user home page;

determining whether said user is one of an advertiser or a tenant, each tenant and each advertiser being uniquely identified and having a specific user role with respect to said portal for the building;

receiving data input by said user with respect to a user profile; and processing via said portal said data to create one of a building user home cage or a vendor user home cage for the user, providing a personalized home cage for each tenant and each advertiser;

providing a building administrator for controlling portal access and capabilities of a tenant of the building;

receiving a vendor application from a vendor, the vendor application including a vendor category;

selectively approving the vendor application from the vendor;

creating a vendor user profile for the vendor;

creating a purchasing class consisting of one or more tenants of said building, the purchasing class having a set of purchasing rules, wherein according to the purchasing rules of the purchasing class, the tenant within the purchasing class is permitted to purchase a first product or service at a first specified time of day and prevented from purchasing the first product or service at a second specified time of day and wherein a second purchasing class prevented from purchasing the first product or service at the first specified time of day;

providing a manager for controlling the purchasing rules.

12. A method for controlling the advertisements viewable to tenants and services and products purchased by the tenants in a building, said method under the control of a manager, the method comprising the steps of:

providing a portal for a building, said portal accessible via the Internet by a plurality of tenants of said building, wherein providing a portal for a building includes the step of:

providing a user with access to an anonymous user home page; determining whether said user is one of an advertiser or a tenant, each tenant and each advertiser being uniquely identified and having a specific user role with respect to said portal for the building;

receiving data input by said user with respect to a user profile; and processing via said portal said data to create one of a building user home page or a vendor user home page for the user;

providing a tenant home page specific to each tenant of said building;

associating an advertiser with the portal;

receiving at least one request from said advertiser to place an advertisement on said portal, wherein said request identifies one or more tenants of said building to whom said advertisement is to be presented, the one or more tenants being selected by said advertiser, wherein said step of receiving at least one request to place an advertisement includes the steps of:

receiving a request from at least one advertiser for historical transaction data, wherein said historical transaction data includes one or more of data processed by collective users of the building and/or data processed by tenant and one or more data regarding prior orders placed for products or services via the portal;

providing said advertiser with the requested historical transaction data, wherein said targeted tenants in the building are determined based on said historical transaction data; and granting or rejecting said request, and upon granting said request, posting said advertisement on the tenant home page of each tenant selected by said advertiser.

* * * * *

UNITED STATES PATENT AND TRADEMARK OFFICE
CERTIFICATE OF CORRECTION

PATENT NO.       : 7,590,723 B2                             Page 1 of 1
APPLICATION NO.  : 09/960994
DATED            : September 15, 2009
INVENTOR(S)      : Mager et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Twenty-first Day of September, 2010

David J. Kappos
*Director of the United States Patent and Trademark Office*